US010215300B2

(12) United States Patent
Reith et al.

(10) Patent No.: US 10,215,300 B2
(45) Date of Patent: Feb. 26, 2019

(54) BENDING FRAME FOR EXTENDING TRAVEL OF AN ACTUATOR FOR A MECHANICALLY ACTUATED COMPONENT

(71) Applicant: Airbus DS GmbH, Taufkirchen (DE)

(72) Inventors: David Reith, Korntal (DE); Stephan Kraus, Oedheim (DE); Thomas Maier, Lauffen (DE)

(73) Assignee: Airbus DS GmbH, Taufkirchen (DE)

( * ) Notice: Subject to any disclaimer, the term of this patent is extended or adjusted under 35 U.S.C. 154(b) by 347 days.

(21) Appl. No.: 14/747,539

(22) Filed: Jun. 23, 2015

(65) Prior Publication Data
US 2015/0369373 A1 Dec. 24, 2015

(30) Foreign Application Priority Data
Jun. 24, 2014 (DE) ........................ 10 2014 009 025

(51) Int. Cl.
*F16K 31/00* (2006.01)
*H02N 2/04* (2006.01)
*B60T 8/36* (2006.01)

(52) U.S. Cl.
CPC .......... *F16K 31/004* (2013.01); *F16K 31/007* (2013.01); *H02N 2/043* (2013.01); *B60T 8/369* (2013.01)

(58) Field of Classification Search
CPC ..... F16K 31/004; F16K 31/007; H02N 2/043; B60T 8/369
See application file for complete search history.

(56) References Cited

U.S. PATENT DOCUMENTS 4,703,215 A 10/1987 Asano
4,845,688 A * 7/1989 Butler ................... G10K 9/121
367/163
(Continued)

FOREIGN PATENT DOCUMENTS

DE 196 43 180 A1 4/1997
DE 198 12 786 A1 9/1999
(Continued)

OTHER PUBLICATIONS

European Office Action issued in European counterpart application No. 15 001 701.0-1556 dated Jul. 19, 2016 (Four (4) pages).
(Continued)

*Primary Examiner* — Matthew W Jellett
*Assistant Examiner* — Christopher Ballman
(74) *Attorney, Agent, or Firm* — Crowell & Moring LLP

(57) ABSTRACT

A bending frame extends the travel of an actuator for a mechanically actuated component. The bending frame includes a plurality of bendable longitudinal struts, which are arranged about a longitudinal axis on which the travel of the actuator runs. The longitudinal struts each extend in the direction of the longitudinal axis, and an application of force enacted by the actuator long the actuation path on the longitudinal struts causes same to bend in a direction perpendicular to the longitudinal axis. Respective cross struts extend out toward the longitudinal axis from each of the longitudinal struts, wherein a first end of a respective cross strut is articulated to a respective longitudinal strut and a second end of the respective cross strut opposite to the first end is provided in order to transmit force to the component in the direction of the longitudinal axis for the purpose of actuation thereof. The longitudinal struts and the cross struts interact with one another such that bending of the longitudinal struts causes the second ends of the cross struts to be (Continued)

displaced in the direction of the longitudinal axis, thereby extending the travel for mechanically actuating the component.

18 Claims, 3 Drawing Sheets

(56) References Cited

U.S. PATENT DOCUMENTS

| | | | | |
|---|---|---|---|---|
| 4,894,811 | A * | 1/1990 | Porzio | G10K 9/121 |
| | | | | 310/334 |
| 4,937,489 | A | 6/1990 | Hattori et al. | |
| 5,333,455 | A * | 8/1994 | Yoshioka | B06B 1/0611 |
| | | | | 188/266.7 |
| 5,729,077 | A * | 3/1998 | Newnham | H02N 2/043 |
| | | | | 310/328 |
| 6,172,445 | B1 * | 1/2001 | Heinz | F02M 47/027 |
| | | | | 310/328 |
| 6,302,333 | B1 | 10/2001 | Hoffmann et al. | |
| 6,371,085 | B1 | 4/2002 | Boecking | |
| 6,530,273 | B1 | 3/2003 | Gottlieb et al. | |
| 7,872,397 | B2 | 1/2011 | Clingman et al. | |
| 8,159,114 | B2 * | 4/2012 | Rahman | E21B 23/00 |
| | | | | 310/328 |
| 2004/0189969 | A1 * | 9/2004 | Mizuno | G02B 7/023 |
| | | | | 355/67 |
| 2005/0073219 | A1 * | 4/2005 | Johansson | H01L 41/0946 |
| | | | | 310/328 |
| 2006/0175934 | A1 * | 8/2006 | Or | H01L 41/0946 |
| | | | | 310/328 |
| 2009/0058227 | A1 * | 3/2009 | Takahashi | G03B 37/02 |
| | | | | 310/323.16 |
| 2012/0229000 | A1 | 9/2012 | Asada et al. | |
| 2013/0000759 | A1 * | 1/2013 | Killeen | F04B 49/03 |
| | | | | 137/565.16 |
| 2013/0234562 | A1 * | 9/2013 | Moler | H02N 2/043 |
| | | | | 310/328 |
| 2016/0193624 | A1 * | 7/2016 | Ikushima | H02N 2/043 |
| | | | | 239/102.2 |

FOREIGN PATENT DOCUMENTS

| | | |
|---|---|---|
| DE | 198 17 320 C1 | 11/1999 |
| DE | 198 54 506 C1 | 4/2000 |
| DE | 199 06 467 A1 | 8/2000 |
| WO | WO98/13928 A1 | 4/1998 |

OTHER PUBLICATIONS

European Search Report issued in European counterpart application No. 15001701.0-1556 dated Dec. 1, 2015, with Statement of Relevancy (Eight (8) pages).

* cited by examiner

BENDING FRAME FOR EXTENDING TRAVEL OF AN ACTUATOR FOR A MECHANICALLY ACTUATED COMPONENT

CROSS REFERENCE TO RELATED APPLICATION

This application claims priority under 35 U.S.C. § 119 from German Patent Application No. 10 2014 009 025.6, filed Jun. 24, 2014, the entire disclosure of which is herein expressly incorporated by reference.

BACKGROUND AND SUMMARY OF THE INVENTION

The invention relates to a bending frame for extending the travel of an actuator for a mechanically actuated component, and in particular for a proportional valve for fuel supply in an orbital propulsion system.

In order to mechanically actuate components, such as valves, it is common to use actuators that convert electrical signals into mechanical motion and actuate the component with this motion. Often, piezoelectric actuators or magnetostrictive actuators are used for this purpose. These have a disadvantage in often not having sufficient travel to actuate a large number of components.

Devices for extending the travel of an actuator are known from the prior art. DE 196 43 180 A1 describes a piezoactive actuation device having a mechanical motion amplifier. The piezoactive elements of the actuation device are surrounded by a shell having semi-elliptical arms. Expansion of the piezoactive elements in the longitudinal direction displaces the semi-elliptical arms perpendicularly to this longitudinal direction.

With the device for amplifying motion according to DE 196 43 180 A1, it proves to be a disadvantage that the direction in which the travel is increased is different from the travel of the actuator, resulting in large dimensions for the device.

The invention therefore addresses the problem of increasing the travel of an actuator in a simple and efficient manner through a compact device.

The problem is solved by a bending frame according to embodiments of the invention.

The bending frame according to an embodiment of the invention serves to extend the travel of an actuator for a mechanically actuated component. Generally, the actuator is a part of the component. An "actuator" is understood here and, henceforth, to be a converter that converts electrical signals into mechanical motion. Preferably, the actuator is a piezoelectric actuator, or optionally even a magnetostrictive actuator. The bending frame can, in principle, be used for any mechanically actuated components, but is preferably used for a valve. The valve is, in particular, a proportional valve and/or a fuel valve. In one variant, the valve is a proportional valve for fuel supply, and in particular a proportional valve for fuel supply in an orbital propulsion system, i.e. in a rocket propulsion.

The bending frame comprises a plurality of bendable longitudinal struts, which are arranged about a longitudinal axis on which the travel of the actuator runs. The longitudinal struts each extend the direction of the longitudinal axis, wherein an application of force enacted by the actuator along the actuation path on the longitudinal struts causes same to bend in a direction perpendicular to the longitudinal axis. Respective cross struts extend out toward the longitudinal axis from each of the longitudinal struts, i.e., a cross strut is provided for each of the longitudinal struts and each cross strut extends from the respective longitudinal strut. A first end of a respective cross strut is articulated to a respective longitudinal strut, and a second end of the respective cross strut opposite to the first end is provided in order to transmit a force to the mechanically actuated component in the direction of the longitudinal axis for the purpose of actuation thereof. In the bending frame according to an embodiment of the invention, the longitudinal struts and the cross struts interact with one another such that bending of the longitudinal struts causes the second ends of the cross struts to vary in the direction of the longitudinal axis due to the articulation of the first ends of the cross struts at the longitudinal struts, whereby the travel for mechanically actuating the component is extended.

The bending frame has an advantage in that a dual leverage redirection is achieved via the bendable longitudinal struts and the cross struts articulated thereto, so that the travel of the actuator in the direction of the longitudinal axis is increased and a compact device for motion amplification is provided by the bending frame.

In a preferred embodiment, the longitudinal struts of the bending frame each comprise two sub-struts, which are articulated at a connection point to one another. A particularly simple articulation is achieved in one variant of the invention by articulating the two sub-struts to one another the connection point via a film hinge. Preferably, the two sub-struts are of equal length. In particular when pressure is exerted on the bending frame by the actuator, the sub-struts are reinforced in a preferred variant, in order to prevent buckling thereof.

In another preferred embodiment, the cross struts extending out from each of the longitudinal struts are articulated with the first end thereof to the respective longitudinal strut via a film hinge, or to the position of the connection point. The film hinge is preferably the film hinge via which optionally also the two sub-struts of the respective longitudinal strut are interconnected.

In another preferred embodiment, the cross struts are interconnected at the second ends thereof, via a shared holding section, wherein the component is mechanically actuated via displacement of the holding section. This provides favorable force transmission for the mechanically actuated component.

In another preferred variant of the bending frame according to the invention, as seen in the direction of the longitudinal axis, all of the longitudinal struts have the same distance from the longitudinal axis, and the angles between adjacent longitudinal struts as measured from the longitudinal axis are of equal magnitude. Due to the design of the bending frame, these angles correspond to the angles between adjacent cross struts. The bending frame is thus endowed with a rotationally symmetrical structure. Such a bending frame is particularly suitable for adjusting cylindrical mechanically actuated components.

In another variant, the longitudinal struts are connected to one another at one of the ends thereof via a cross member running substantially perpendicularly to the longitudinal direction, wherein the longitudinal struts preferably are also connected to one another at the other ends thereof via a (different) cross member running substantially perpendicularly to the longitudinal direction. This makes it possible to very favorably apply force to the bending frame via these cross members. Preferably, each of the cross members is a ring that extends perpendicularly to the longitudinal axis and encircles the longitudinal axis, wherein the center point of the ring preferably lies on the longitudinal axis.

Depending on the configuration of the bending frame, the number of the longitudinal struts may be variously selected. However, at least two longitudinal struts must be provided. In a particularly preferred embodiment, the bending frame comprises four or more longitudinal struts.

In another variant, the bending frame is configured such that that the longitudinal struts bend towards the longitudinal axis along the actuation path when force is applied by the actuator. Optionally, there is also the possibility that the bending takes place away from the longitudinal axis.

The bending frame according to the invention is, in a preferred variant, an integrally-formed component that can be manufactured in a simple manner with a suitable production method. Preferably, the bending frame is made of metal or plastic.

In another variant, the bending frame is configured so that the travel is extended via application of pressure by the actuator onto the bending frame. Nonetheless, the bending frame may also be configured so that the travel is extended via application of traction by the actuator onto the bending frame.

As already mentioned above, the bending frame may be provided for a variety of types of actuators in order to extend the travel. Preferably, the actuator is a piezoelectric actuator, and in particular a piezoelectric ring actuator or a magnetostrictive actuator.

In addition to the bending frame described above, the invention further relates to a mechanically actuated component that comprises an actuator and the bending frame according to the invention or one or more preferred variants of the bending frame according to the invention. The bending frame then extends the travel of the actuator in order to actuate the mechanically actuated component.

Other objects, advantages and novel features of the present invention will become apparent from the following detailed description of one or more preferred embodiments when considered in conjunction with the accompanying drawings.

DETAILED DESCRIPTION OF THE DRAWINGS

An embodiment of the invention shall be described below, with reference to a bending frame that is provided in order to extend the travel of a piezoelectric ring actuator, as is evident from FIGS. 2 and 3 described below. The piezoelectric actuator serves to actuate a proportional valve, which is provided in order to supply fuel for a rocket propulsion. Optionally, the bending frame may also be used to extend the travel of other actuators, such as, for example, magnetostrictive actuators.

Figure 1:
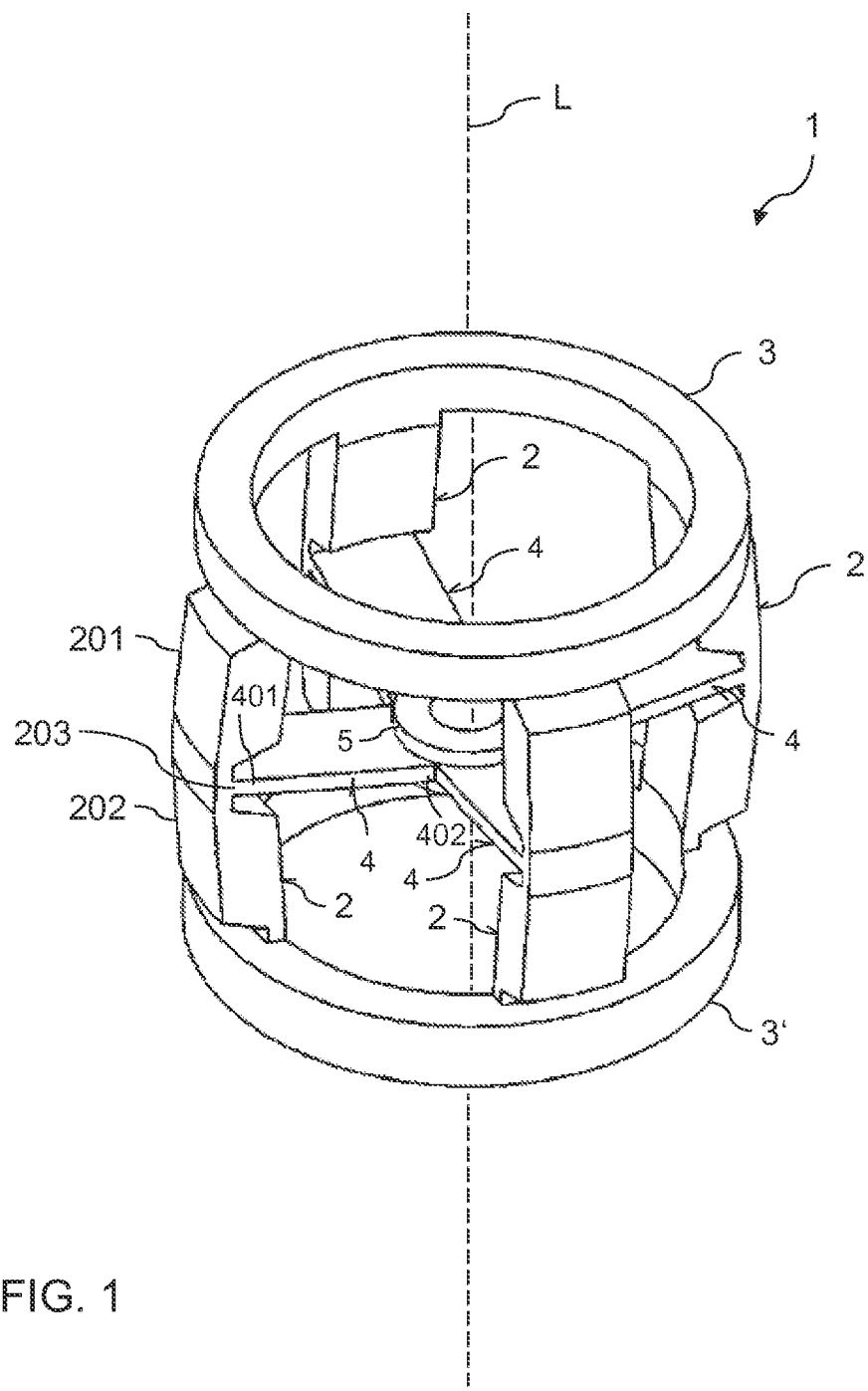
FIG. 1 illustrates a perspective view of an embodiment of a bending frame according to the invention.

FIG. 1 illustrates a perspective view of the bending frame 1, which is an integrally-formed component composed in particular of metal or plastic. The bending frame is rotationally symmetrical with respect to a longitudinal axis L along which the actuator also travels, this travel being extended by the bending frame. The bending frame 1 comprises four longitudinal struts 2, which are arranged adjacent to one another about the longitudinal axis L at angles of 90° and extend in the direction of the longitudinal axis. The four longitudinal struts are held at opposite ends thereof between an upper ring 3 and a lower ring 3'. The longitudinal struts each comprise an upper sub-strut 201 and a lower sub-strut 202, which are connected to one another via a connection point present therebetween, which has a reduced thickness, in the form of a film hinge 203. For reasons of clarity, the reference signs 201 to 203 are reproduced only with one strut in FIG. 1.

A cross strut 4 extends out outward the longitudinal axis L from each of the longitudinal struts 2. Therein, a first end 401 of each of the cross struts 4 is fixed to the film hinge 203 of a longitudinal strut 2 and thus articulated to the longitudinal strut. In turn, the ends 402 of the respective cross struts 4 opposite to the first ends lead to a shared holding section 5, which actuates a proportional valve when the corresponding piezoelectric actuator applies force to the bending frame. For reasons of clarity, the reference signs 401 and 402 are depicted only for one of the cross struts in FIG. 1.

Application of pressure from above in the direction of the longitudinal axis L onto the bending frame 1, the application of pressure being enacted by the piezoelectric actuator, leads to bending of the longitudinal struts at the film hinges. This bending, in turn, leads to movement of the cross struts 4 and, therewith, of the holding section 5. This movement results in actuation of the corresponding proportional valve. The travel due to the movement of the holding section 5 is longer than the travel of the piezoelectric actuator, as shall be described below with reference to FIGS. 2 and 3.

Figure 2:
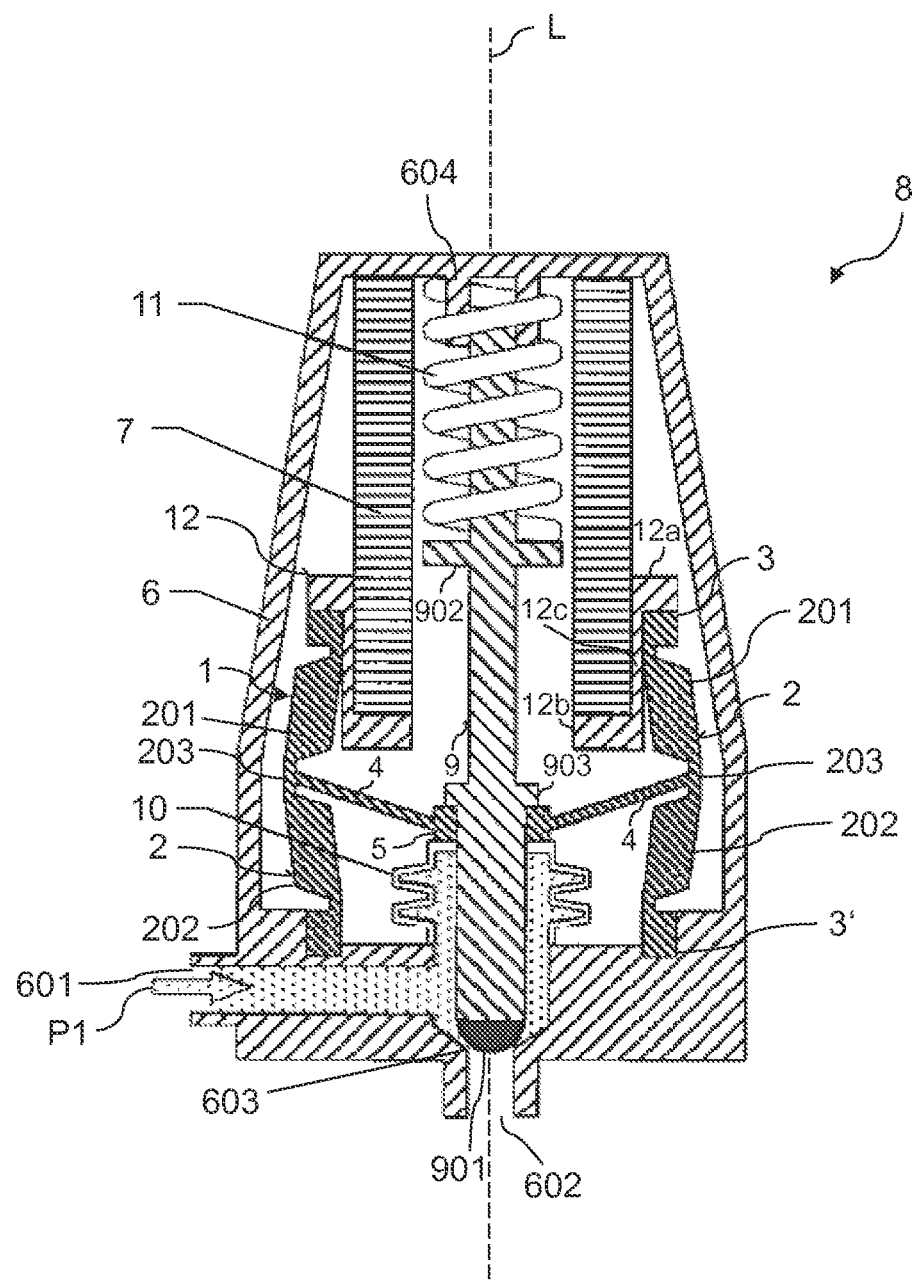
FIG. 2 illustrates a sectional view of a proportional valve that includes the bending frame from FIG. 1, in a closed position of the valve.

FIG. 2 illustrates a sectional view of a proportional valve 8 that is actuated via a piezoelectric ring actuator 7 with the aid of the bending frame from FIG. 1. The components of the valve are therein arranged in a housing 6. The supply of rocket fuel is controlled via the valve, wherein a horizontally running fuel inlet 601 and a vertically running fuel outlet 602 are provided in the housing 6 for his purpose. The range in the valve that is filled with fuel is depicted with dots. The flow of the fuel into the inlet is indicated by the arrow P1. In FIG. 2, the valve is shown in a closed position thereof, so that no fuel leaks out from the outlet 602. To control the fuel flow, a valve stem 9 having a valve top 901 is provided, which rests adjacent on a valve seat 603 adjacently to the outlet 602 in the closed position in FIG. 2. Movement of the stem 9 in a vertically upward direction causes the top 901 to lift from the valve seat 603, and the amount of vented fuel is moreover regulated in accordance with the distance of the top from the valve seat. The valve is actuated therefore via the movement of the valve stem 9 along the longitudinal axis L, which corresponds to the longitudinal axis from FIG. 1.

At the lower end of the valve stem 9, there is also a metallic bellows 10, which expands upwards upon movement of the stem and prevents the fuel from flowing into the interior of the housing 6. In the closed position of FIG. 2, the valve top 901 is held onto the valve seat 603 by the force of a coil spring 11. The coil spring is held between a circular projection 902 of the stem 9 and the upper end of the housing 6. At the upper end of the housing, there is also a circular receptacle 604 into which the upper end of the valve stem is guided. To open the valve, the valve stem 9 is actuated with the aid of the piezoelectric ring actuator 7, which is arranged in the upper part of the valve, within the housing 6. The piezoelectric actuator 7 then is operatively connected to the bending frame 1 via a cylindrical element 12. The bending frame 1 is inserted into the housing 6 and has the lower ring 3' which rests on an inner side of the housing 6. The section of the bending frame is shown along two opposite longitudinal struts 2. The cylindrical element 12 comprises an upper ring section 12a and a lower ring section 12b, between which a thin cylinder section 12c extends. The underside of the upper ring section 12a rests then on the upper side of the ring 3 of the bending frame 1. In turn, the underside of the piezoelectric ring actuator 7 rests on the upper side of the lower ring section 12b.

The cross struts 4 of the bending frame 1 extend obliquely downward from the film hinge 203 in the mounting position of FIG. 2. The annular holding section 5 formed at the ends of the cross struts is arranged between an annular projection 903 of the valve stem 9 and the upper side of the bellows 10. In the valve position of FIG. 2, the piezoelectric actuator 7 is not actuated, i.e., no force is being exerted via the cylindrical element 12 onto the ring 3 and thus the bending frame 1. To open the valve, the piezoelectric actuator is adjusted via an electrical control signal, resulting in the generation of a compressive force downward in the direction of the longitudinal axis L, as is apparent from FIG. 3 described below.

Figure 3:
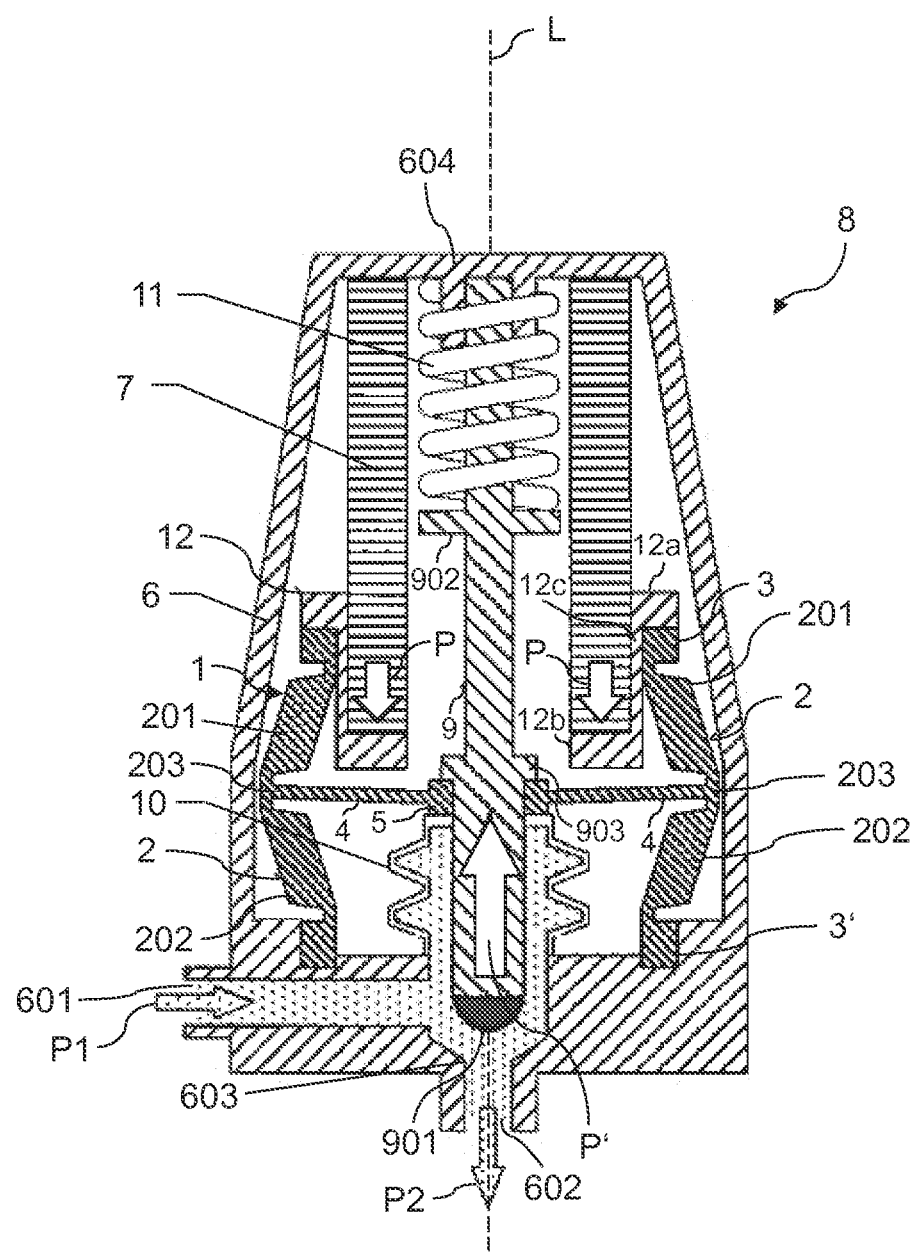
FIG. 3 illustrates a sectional view of the valve from FIG. 2, in an open position.

FIG. 3 illustrates the same valve as in FIG. 2, but with the valve now in the open position. To achieve this, the piezoelectric actuator expands downward on the basis of an electrical signal, as indicated by the arrows P. By means of the cylindrical element 12, pressure is thereby applied onto the upper edge 3 of the bending frame 1, resulting in turn in outward movement of the sub-struts 201 and 202 at the film hinges 203 and thus in bending of the longitudinal strut 2. In order to avoid kinking of the individual sub-struts 201 and 202 during this application of force, the sub-struts are suitably reinforced. The outward movement of the sub-struts leads to upward movement of the holding section 5, due to the flexible fixation or articulation of the cross struts 4 to the film hinge 203.

The upward movement of the holding section 5 also causes the valve stem 9 to move upward, as indicated by the arrow P. This releases the valve top 901 from the valve seat 603, and causes the metallic bellows 10 to expand. As a result, the outlet 602 is opened and fuel is able to flow out therethrough, as indicated by the arrow P2. Because of the rotationally symmetrical bending frame 1, then, the valve stroke generated via the movement of the holding section 5 is successfully made to be considerably greater than the original stroke of the piezoelectric actuator 7. In other words, the travel of the piezoelectric actuator is multiplied with the aid of the bending frame. At the same time, the input motion of the piezoelectric actuator 7 and the output motion of the valve stem 9 lie on the same axis, so that the embodied actuation of the cylindrical fuel control valve is achieved in a simple manner.

The embodiment of the invention described above has a number of advantages. The travel of an actuator, such as a piezoelectric actuator or optionally also of another actuator, can be multiplied in a simple manner. The direction of travel then lies in the longitudinal axis of the actuator, enabling a compact housing in the component intended to be mechanically actuated and in particular a valve. The bending frame according to the invention makes it possible then to employ actuators that realize a large force with only a small stroke even in mechanically actuated components, which require a large actuation path. If, in lieu of the use of the bending frame according to the invention, the length of the actuator were to be increased instead, this would lead to a greater mass and greater space/volume. Additionally, the electrical power and costs for the actuator would be considerably higher. The bending frame according to the invention thus makes it possible to cost-effectively and compactly realize a mechanically actuated component.

LIST OF REFERENCE SIGNS 1 bending frame
2 longitudinal strut
201, 202 sub-struts
203 film hinge
3, 3' ring
4 cross strut
401 first end of the cross strut
402 second end of the cross strut
5 holding section
6 housing
601 inlet
602 outlet
603 valve seat
604 receptacle
7 piezoelectric ring actuator
8 proportional valve
9 valve stem
901 valve top
902, 903 annular projections
10 bellows
11 coil spring
12 cylindrical element
12a upper ring section of the cylindrical element
12b lower ring section of the cylindrical element
12c cylinder section of the cylindrical element
P1, P2 directions of flue of the fuel
P, P' directions of movement of the actuator or valve
L longitudinal axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bending frame for extending travel of an actuator for a mechanically actuated component, comprising:
   a plurality of bendable longitudinal struts, which are arranged about a longitudinal axis on which the travel of the actuator runs;
   wherein the longitudinal struts each extend in a direction of the longitudinal axis, and an application of force enacted by the actuator along an actuation path on the longitudinal struts causes the longitudinal struts to bend in a direction perpendicularly to the longitudinal axis;
   respective cross struts extending out toward the longitudinal axis from each of the longitudinal struts, wherein a first end of a respective cross strut is articulated to a respective longitudinal strut and a second end of the respective cross strut opposite to the first end is provided in order to transmit force to the component in the direction of the longitudinal axis for the purpose of actuation thereof; and
   wherein the longitudinal struts and the cross struts interact with one another such that bending of the longitudinal struts causes the second ends of the cross struts to be displaced in the direction of the longitudinal axis, thereby extending the travel for mechanically actuating the component,
   wherein the cross struts are interconnected at the second ends thereof, via a shared holding section, and wherein the component is mechanically actuated via a direct displacement of the holding section that is not otherwise transferred throughout an entirety of the component.

2. The bending frame according to claim 1, wherein the mechanically actuated component is a proportional valve for fuel supply in an orbital propulsion system.

3. The bending frame according to claim 1, wherein the longitudinal struts each comprise two sub-struts, which are articulated at a connection point to one another.

4. The bending frame according to claim 3, wherein the two sub-struts are articulated to one another via a film hinge.

5. The bending frame according to claim 3, wherein the cross struts extending out from each of the longitudinal struts are articulated with the first end thereof to the respective longitudinal strut via a film hinge, and/or to the position of the connection point.

6. The bending frame according to claim 5, wherein:
as seen in the direction of the longitudinal axis, all of the longitudinal struts have the same distance from the longitudinal axis, and
angles between adjacent longitudinal struts as measured from the longitudinal axis are of equal magnitude.

7. The bending frame according to claim 6, wherein:
the longitudinal struts are connected to one another at one of the ends thereof via a cross member running substantially perpendicularly to the longitudinal direction, and
the longitudinal struts are also connected to one another at the other ends thereof via a cross member running substantially perpendicularly to the longitudinal direction.

8. The bending frame according to claim 1, wherein:
as seen in the direction of the longitudinal axis, all of the longitudinal struts have the same distance from the longitudinal axis, and
angles between adjacent longitudinal struts as measured from the longitudinal axis are of equal magnitude.

9. The bending frame according to claim 1, wherein:
the longitudinal struts are connected to one another at one of the ends thereof via a cross member running substantially perpendicularly to the longitudinal direction, and
the longitudinal struts are also connected to one another at the other ends thereof via a cross member running substantially perpendicularly to the longitudinal direction.

10. The bending frame according to claim 9, wherein each of the cross members is a ring that extends perpendicularly to the longitudinal axis and encircles the longitudinal axis, wherein the center point of the ring preferably lies on the longitudinal axis.

11. The bending frame according to claim 1, wherein the bending frame comprises four or more longitudinal struts.

12. The bending frame according to claim 1, wherein, the bending frame is configured such that the longitudinal struts bend towards the longitudinal axis or away from the longitudinal axis along the actuation path when force is applied by the actuator.

13. The bending frame according to claim 1, wherein the bending frame is an integrally-formed component.

14. The bending frame according to claim 1, wherein the bending frame is configured so that the travel is extended via application of pressure by the actuator onto the bending frame or via application of traction by the actuator onto the bending frame.

15. The bending frame according to claim 1, wherein the bending frame is provided in order to extend the travel of a piezoelectric actuator or a magnetostrictive actuator.

16. The bending frame according to claim 15, wherein the piezoelectric actuator is a piezoelectric ring actuator.

17. A mechanically actuated component, comprising:
an actuator; and
a bending frame which extends the travel of the actuator in order to actuate the component, the bending frame comprising:
a plurality of bendable longitudinal struts, which are arranged about a longitudinal axis on which the travel of the actuator runs;
wherein the longitudinal struts each extend in a direction of the longitudinal axis, and an application of force enacted by the actuator along an actuation path on the longitudinal struts causes the longitudinal struts to bend in a direction perpendicularly to the longitudinal axis;
respective cross struts extending out toward the longitudinal axis from each of the longitudinal struts, wherein a first end of a respective cross strut is articulated to a respective longitudinal strut and a second end of the respective cross strut opposite to the first end is provided in order to transmit force to the component in the direction of the longitudinal axis for the purpose of actuation thereof; and
wherein the longitudinal struts and the cross struts interact with one another such that bending of the longitudinal struts causes the second ends of the cross struts to be displaced in the direction of the longitudinal axis, thereby extending the travel for mechanically actuating the component,
wherein the cross struts are interconnected at the second ends thereof, via a shared holding section, and wherein the component is mechanically actuated via a direct displacement of the holding section that is not otherwise transferred throughout an entirety of the component.

18. The mechanically actuated component according to claim 17, wherein the component is a proportional valve for fuel supply in an orbital propulsion system.

* * * * *